(12) United States Patent
Groenveld et al.

(10) Patent No.: US 11,148,858 B2
(45) Date of Patent: Oct. 19, 2021

(54) HINGING PRODUCT AND APPARATUS AND METHOD FOR FORMING A HINGING PRODUCT

(71) Applicant: PaperFoam B.V., Barneveld (NL)

(72) Inventors: Roelof Wessel Groenveld, Soest (NL); Willem Johan van den Brink, Hoevelaken (NL); Jan Wietze Huisman, Wilp (NL)

(73) Assignee: PAPERFOAM B.V., Barneveld (NL)

( * ) Notice: Subject to any disclaimer, the term of this patent is extended or adjusted under 35 U.S.C. 154(b) by 0 days.

(21) Appl. No.: 16/157,373

(22) Filed: Oct. 11, 2018

(65) Prior Publication Data

US 2019/0367221 A1  Dec. 5, 2019

(30) Foreign Application Priority Data

Oct. 12, 2017 (NL) .................................... 2019712

(51) Int. Cl.
| | |
|---|---|
| B65D 43/16 | (2006.01) |
| B65D 81/02 | (2006.01) |
| B65D 85/32 | (2006.01) |
| B29C 45/00 | (2006.01) |
| B29C 45/14 | (2006.01) |
| B29K 105/24 | (2006.01) |
| B29K 711/12 | (2006.01) |
| B29L 31/00 | (2006.01) |

(52) U.S. Cl.
CPC ........ *B65D 43/162* (2013.01); *B29C 45/0017* (2013.01); *B29C 45/14786* (2013.01); *B65D 81/022* (2013.01); *B65D 85/32* (2013.01); *B29K 2003/00* (2013.01); *B29K 2105/24* (2013.01); *B29K 2711/12* (2013.01); *B29L 2031/7168* (2013.01)

(58) Field of Classification Search
CPC ...... B65D 43/16; B65D 43/162; B65D 81/02; B65D 81/022; B65D 85/32; B65D 85/322; B65D 85/324
USPC .......................... 206/521, 521.1–521.9, 523
See application file for complete search history.

(56) References Cited

U.S. PATENT DOCUMENTS

| | | | | |
|---|---|---|---|---|
| 4,417,508 A | * | 11/1983 | Haas, Sr. ............... | A21B 5/023 99/355 |
| 5,376,320 A | * | 12/1994 | Tiefenbacher ........... | A21D 2/14 264/50 |

(Continued)

FOREIGN PATENT DOCUMENTS

| | | |
|---|---|---|
| WO | 9515849 | 6/1995 |
| WO | 0039214 | 7/2000 |

*Primary Examiner* — Bryon P Gehman
(74) *Attorney, Agent, or Firm* — Hoffmann and Baron, LLP (57) ABSTRACT

Product made using a mass that includes natural polymers, wherein the product has at least a first product part connected by a hinge construction to a second product part, wherein the hinge construction has at least one flexible sheet element and at least one bridge portion made of the mass that includes natural polymers, wherein the hinge construction is designed such that, prior to a first time hinging, the at least one bridge portion forms a more rigid connection between the first and second product parts than the flexible sheet element and by hinging the bridge portion is severed, such that the first and second parts are substantially only connected by the at least one flexible sheet element.

16 Claims, 10 Drawing Sheets

(56) References Cited

U.S. PATENT DOCUMENTS

| | | | | |
|---|---|---|---|---|
| 5,776,388 A | * | 7/1998 | Andersen | B32B 13/02 |
| | | | | 264/45.5 |
| 5,843,544 A | * | 12/1998 | Andersen | B29C 44/0407 |
| | | | | 428/36.5 |
| 6,572,909 B1 | * | 6/2003 | Bagwell | B65D 43/162 |
| | | | | 426/394 |
| 9,340,350 B2 | * | 5/2016 | Kuruvilla | B29C 51/082 |
| 10,329,058 B2 | * | 6/2019 | Kuruvilla | B65D 43/0212 |
| 2004/0178540 A1 | * | 9/2004 | Huisman | B65D 43/162 |
| | | | | 264/478 |

* cited by examiner

HINGING PRODUCT AND APPARATUS AND METHOD FOR FORMING A HINGING PRODUCT

This application claims priority from The Netherlands patent application no. NL 2019712, filed on Oct. 12, 2017, which is incorporated herein in its entirety.

FIELD OF THE INVENTION

The invention relates to a product made using a mass comprising natural polymers comprising at least a first and a second product part, connected to each other by a hinge construction. The invention further relates to an apparatus and a method for forming such product.

U.S. Pat. No. 5,376,320 discloses a hinging product, comprising a first product part and a second product part, connected to the first part by a hinge. Said hinge is formed by a flexible strip bridging a gap between the separate first and second product parts. In an apparatus for forming such product two separate mold cavities are provided, with a separating wall in between them. Each cavity has at least one injection opening. During production a label is placed on top of said separating wall, and folded over opposite edges of said separating wall. A closing mold part is placed over and into said mold cavities, at the same time clamping the label between the top of said separating wall and the closing mold part. When the product is formed and taken out of the mold, the one product part can be folded on top of the other by folding the label part extending between said first and second product part.

WO00/39214 discloses hinging products such as clam shells, made using a mass of natural polymers formed in a mold. In these products a hinge is formed by the mass comprising the natural polymers, by locally influencing the material composition of the product, such that material properties of the relevant part deviate from the material properties of adjoining parts.

SUMMARY OF THE INVENTION

An aim of the present disclosure is to provide an alternative hinging product made using natural polymers. An aim of the present disclosure is to provide a hinging product which is easy to manufacture. An aim of the present disclosure is to provide a product which is easy to handle, especially after molding of the product. An aim of the present disclosure is to provide a method for forming a hinging product using natural polymers. An aim of the present disclosure is to provide an apparatus for forming hinging products using natural polymers, especially for mold forming such products. An aim of the present disclosure is to provide packaging having hinging parts, made using natural polymers, which can be handled easily during packaging of products.

At least one of these and other aims individually or in combination can be obtained with a product, method and/or apparatus according to the disclosure.

In an aspect a product according to the present disclosure can be made using a mass comprising natural polymers, wherein the product comprises at least a first and a second product part, connected by a hinge construction. The hinge construction comprises at least one flexible sheet element, such as for example a strip, and one bridge portion made of said mass comprising natural polymers. The hinge construction is designed such that, prior to a first time hinging of the first and second product parts relative to each other, the at least one bridge portion forms a more rigid connection between the first and second product part than the flexible sheet element or elements and by hinging the first part relative to the second part for the first time said bridge portion is severed, for example at least partly torn, sheared and/or broken, such that the first and second part are substantially only connected to each other by the or each flexible sheet element.

In a product according to the disclosure preferably when the product is retrieved from a mold in which it is formed the bridging portion or portions form(s) a relatively rigid connection between the first and second product part, preferably at least rigid enough to prevent the one product part to move, especially pivot, relative to the other product part under the influence of gravity. This allows easy manipulation, for example during demolding, stacking, unstacking and handling during for example filling of the product. When the first product part is pivoted relative to the second product part after demolding, over the hinging construction, then the bridging portion will loose the rigidity, especially by severing such as by partly breaking, tearing and/or shearing, such that the first and second product parts will substantially only be connected to each other by the or each flexible strip, allowing easy and repetitive hinging.

In embodiments the bridging portion or portions can be provided such that the at least one flexible sheet element, such as one or more strips, is or are covered at least partly on at least one surface by said mass forming the bridging portion. In the same or different embodiments at least two flexible sheet elements such as strips can be provided, wherein the bridging portion is provided at least partly between said flexible sheet elements and/or at least two bridging portions can be provided wherein at least one flexible sheet element, such as a strip, can be provided extending between said bridging portions.

In an aspect a method of the disclosure can comprise introducing a mass comprising at least natural polymers, such as starch, into a mold wherein the mass in the mold is heated, such that it involves at least cross linking of the natural polymers. The mold comprises at least two product part forming parts, connected by a bridging portion, wherein at least one flexible sheet element, such as a strip, is placed in and/or on said bridging portion, preferably prior to introducing said mass into said mold. Said at least one flexible sheet element is placed such that it extends at least partly into the product forming parts on either side of the bridging portion and is connected to the mass introduced into the mold. The mold used is such that during introduction of the mass into the mold at least part of the mass will flow over the bridging portion, over and/or alongside said at least one flexible sheet element, forming at least one bridge portion in the product to be formed.

In embodiments the mass covers at least part of at least one surface of the flexible sheet element, connecting the product parts formed in said product part forming parts. Hence the bridging portion can form a layer over at least one surface of the flexible sheet element.

In embodiments the or each flexible sheet element is pinned onto at least one and preferably a series of pins in and/or on said bridging portion, retaining the at least one flexible sheet element in position during introduction of the mass into the mold. In such embodiments the or each flexible sheet element is preferably pinned onto the or each pin such that upon closure of the mold a surface of the flexible sheet element is in abutment with a mold face, such that mass can only flow over an opposite surface of the relevant flexible sheet element for forming a bridge portion.

In embodiments each of the mold parts can be designed for forming a shell part, each having a first wall portion connected to the bridging portion, wherein the or each flexible sheet element is placed into and/or onto the bridging portion, having a longitudinal direction, wherein side portions of the or each flexible sheet element are folded onto wall portions of the relevant mold parts, each designed for forming an inner surface portion of a relevant product part formed therein.

In an aspect an apparatus according to the disclosure can comprise a mold, where the mold comprises at least two product part forming parts, connected by a bridging portion. The apparatus comprises a sheet system for placing at least one flexible sheet element in and/or on said bridging portion, preferably prior to introducing said mass into said mold, said at least one flexible sheet element extending at least partly into the product forming parts on either side of the bridging portion, to be connected to the mass introduced into the mold. Preferably such that the mass covers at least part of at least one surface of the flexible sheet element, connecting the product parts formed in said product part forming parts and/or that the mass forms at least one bridging portion adjacent said at least one flexible sheet element.

In order to further elucidate the present invention, embodiments thereof shall be disclosed and discussed hereafter, with reference to the drawings. Therein shows schematically.

BRIEF DESCRIPTION OF THE FIGURES

DETAILED DESCRIPTION OF THE INVENTION

In this description embodiments are shown and disclosed of the invention, by way of example only. These should by no means be interpreted or understood as limiting the scope of the present invention in any way. In this description the same or similar elements are indicated by the same or similar reference signs. In this description embodiments of the present invention shall be discussed with reference to starch based natural polymers as natural polymers, by way of example only. Other natural polymers can be used in such mass as well, in addition to or as an alternative for starch.

In this disclosure primarily packaging products are described as examples of products according to the description. However also other hinging products fall within the ambit of the claims. In this disclosure hinging should be understood as including at least pivoting of a first product part relative to a second product part connected thereto through a hinging construction, especially pivoting around a pivoting line or a series of pivoting lines provided by the hinging construction. Such pivot line can be a real line or an imaginary line, and may be straight or curved. Hinging should at least be understood as including movement of the first product part from a position substantially next to the second product part connected thereto through the hinging construction to a position substantially on top of said second product part, by bending and/or folding a flexible sheet element connecting the two product parts.

In this disclosure a packaging product should be understood as at least including but not limited to a product in which other products can be packaged, for example for storage, transport and/or display. In the present disclosure a hinging product such as a packaging product can preferably be closed and opened several times without the first and second parts coming apart, since they will be held together at least by the at least one flexible sheet element, such as one or more flexible strips.

In this disclosure a sheet should be understood as an element having a longitudinal direction and a width direction perpendicular thereto, and a thickness direction perpendicular to both the length and width direction. A length in the longitudinal direction and a width in the width direction are substantially larger than the thickness in the thickness direction. A strip is to be understood as at least meaning, but not limited to, a relatively flat, narrow band of a flexible sheet material, having a longitudinal direction, and a width and thickness. The length in longitudinal direction is larger than the width, measured in a width direction when the strip is substantially flat. The thickness is smaller than the width.

Flexible can in this disclosure be understood as meaning that a flexible sheet element, such as a strip, can be folded repeatedly at least in a direction substantially perpendicular to the longitudinal direction over an angle of at least 45 degrees, preferably at least 90 degrees, for example at least about 180 degrees, with a bending radius which is equal to or smaller than the width of the strip in a flat position. In this disclosure a flexible sheet material may be understood as meaning that the sheet material used in a hinge construction in a product according to the disclosure is more flexible than any bridging portion in the same product.

A flexible sheet element such as a strip can be made of any suitable material, such as paper, fabric, polymers and the like, and can be single layered or a laminate. The material of which the sheet element, such as a strip is made is preferably biodegradable, more preferably biodegradable with the material of the product parts connected therewith. A flexible sheet element such as a strip preferably has opposite surfaces, seen in the thickness direction, wherein at least one of said surfaces is suitable for the mass of which the product is formed to adhere to, for example the natural polymers in the mass. In embodiments the flexible sheet material, such as a strip, may be porous or perforated for allowing part of the mass to enter into and/or through the sheet material.

In this disclosure a mass comprising natural polymers can be understood as at least including but not limited to a batter or suspension comprising natural polymers, such as but not limited to starch or tapioca, wherein the mass preferably contains water, such that the mass is flowable prior to heating and will allow gelatinization and cross linking of natural polymers in said mass during heating in a mold. Examples of suitable masses are disclosed in for example WO2004/033179, U.S. Pat. No. 5,376,320, WO00/39214 and WO96/30186, all incorporated herein by reference as far as disclosing masses, such as suspensions, comprising natural polymers suitable for mold forming products according to this disclosure.

In the present disclosure apparatus, including molds will be described for forming products according to the disclosure. In the examples closed molds are primarily discussed, in which the mass comprising natural polymers can be injected under pressure, and can be heated in order to obtain at least cross linking of natural polymers in the mass. Such molds and mold systems are for example disclosed in WO2004/033179, U.S. Pat. No. 5,376,320, WO00/39214 and WO96/30186, all incorporated herein by reference as far as disclosing molding apparatuses for molding natural polymer based masses, such as Paperfoam®, a product material made by Paperfoam, Barneveld, The Netherlands. However, products according to the present disclosure can also be formed, for example using a method as disclosed, in different molding systems and apparatus, for example in molds in which the mass is introduced without pressure and is pressed through the mold cavity or cavities by closure of the mold. Such molding systems are for example known from U.S. Pat. No. 4,417,508, by Franz Haas.

In the embodiments of a molding apparatus as discussed hereafter by way of example, a mold is shown having mold cavities for simultaneously forming two products. It will however be clear that also other numbers of mold cavities can be provided, such as for forming one or more than two products in a molding cycle.

In embodiments of a manufacturing method and apparatus according to the disclosure as will be discussed hereafter the or each flexible sheet element is placed in the mold, such that it is adhered to the product or at least integrated into the product during molding. It is however also possible to adhere a flexible sheet like element to the product, as an intermediate product, after molding, for example by using an adhesive, preferably a non-toxic, more preferably a biodegradable adhesive, for example a starch based adhesive, such that the sheet like element connects the first and second product part.

Figure 1:
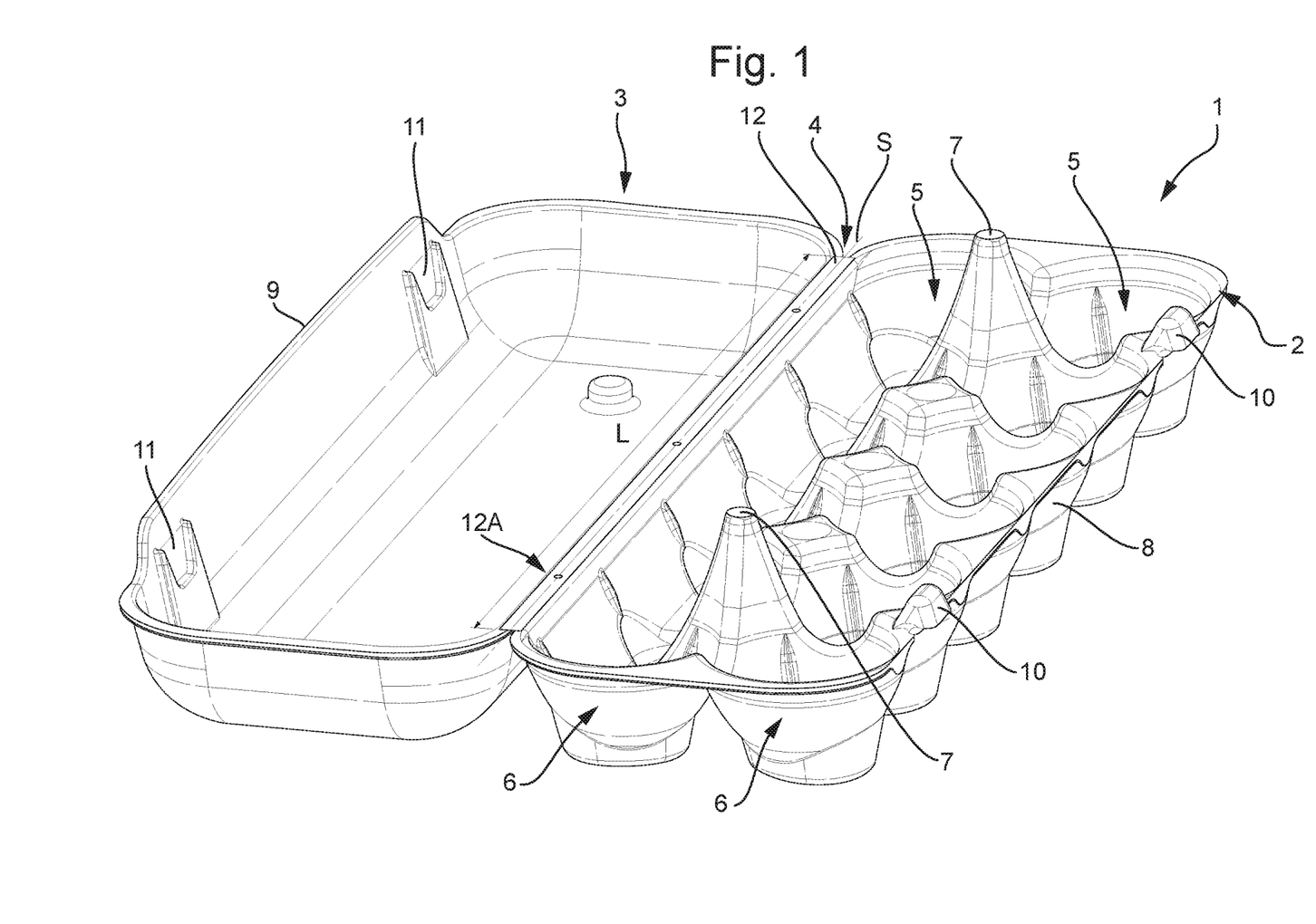
FIG. 1 in perspective view an embodiment of a hinging product, in open position.

FIG. 1 shows a hinging product 1, in perspective view, which in this embodiment by way of example only is shown as an egg box. The product 1 comprises a first product part 2, connected to a second product part 3 by a hinge construction 4, as will be discussed. The first and second product parts 2, 3 can both be substantially shell shaped, having one or more relatively thin walls defining a volume within such part 2, 3. By closing the product 1 such volumes together will form one volume enclosed with such product 1.

Figure 1A:
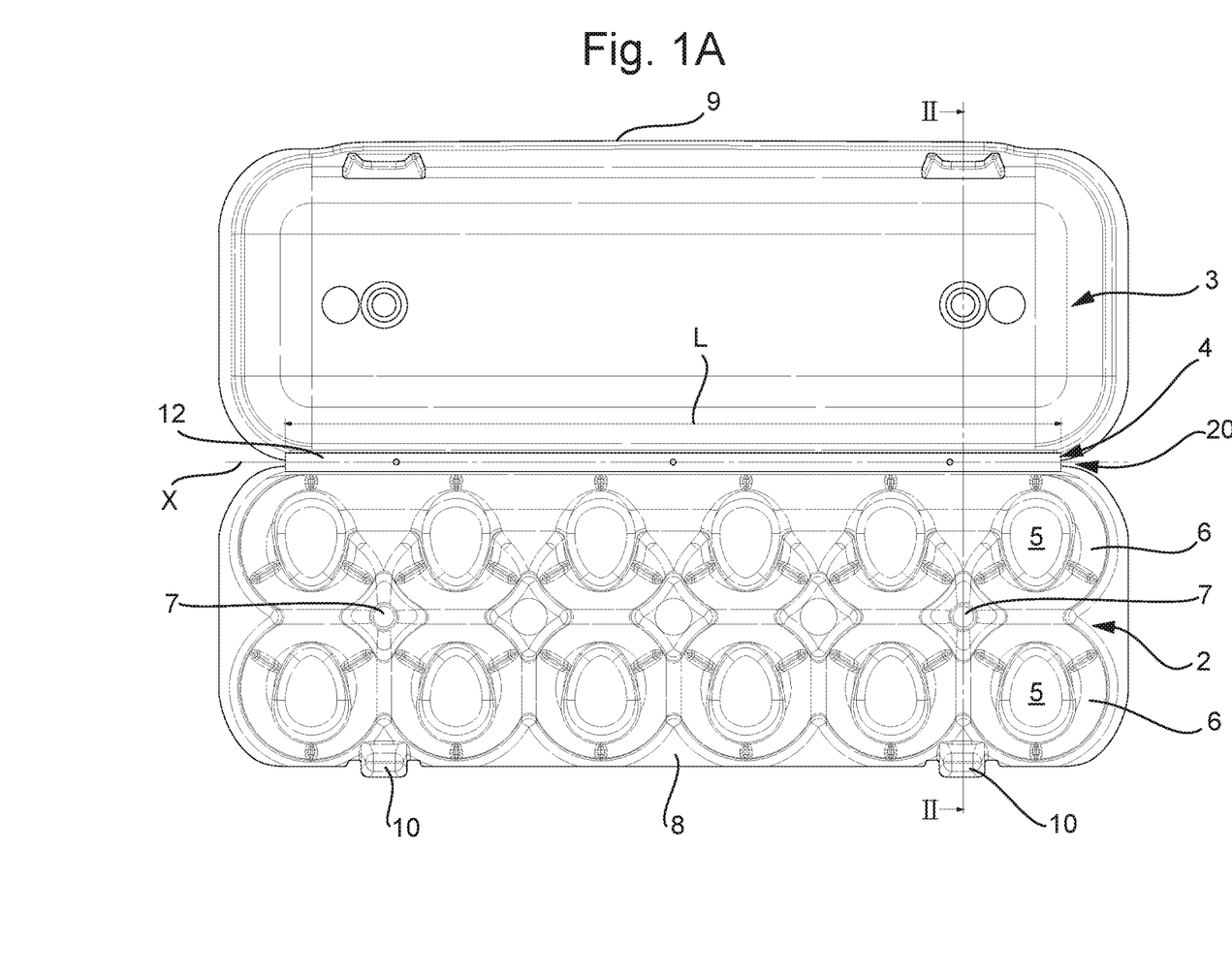
FIG. 1A a top view of a product of FIG. 1.
Figure 2:
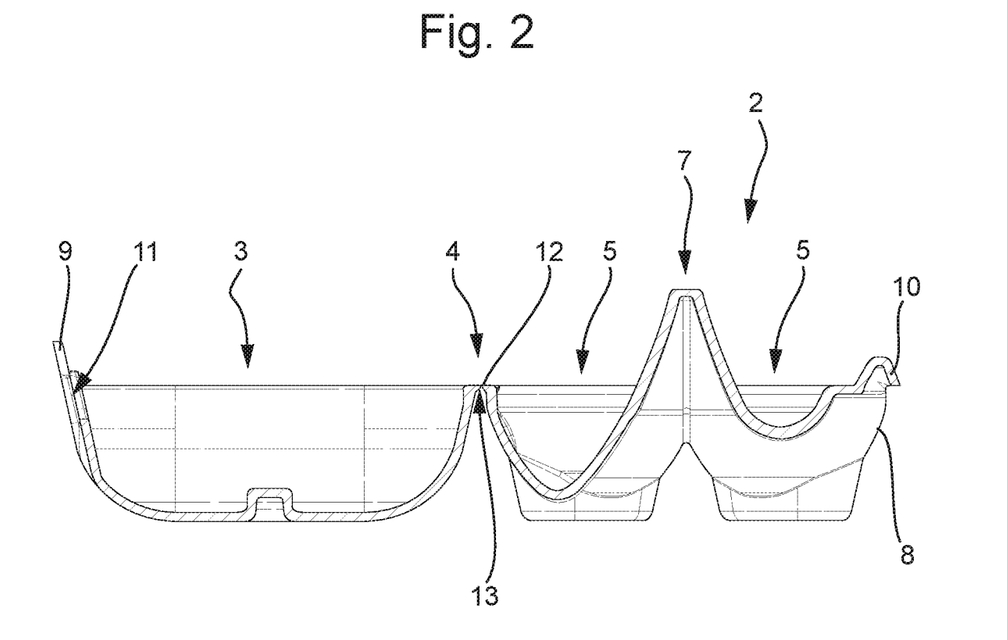
FIG. 2 a product of FIG. 1, in cross sectional view along the line II-II in FIG. 1A.

The first product part 2 in the embodiment of FIGS. 1, 1A and 2 comprises receiving spaces 5 for eggs (not shown) which can be set in said spaces 5 in a known manner. The spaces 5 are provided in two parallel rows 6, in this embodiment each row 6 comprising six such spaces 5. Between the two rows 6 two pillars 7 are provided, extending above the spaces 5, suitable for supporting the second part 3 when the product 1 is closed. The second part 3 is designed as a lid. The first part 2 has a first edge 8 opposite the hinge construction 4, whereas the second part 3 has a second edge 9 opposite the hinge construction 4. The first edge 8 comprises first locking elements 10, whereas the second edge 9 comprises second locking elements 11, such that in the closed position of the packaging product 1 the first and second locking elements 10, 11 can mutually engage for releasable locking the first and second parts 2, 3 in the closed position.

The product 1 is made of a mass comprising natural polymers, such as starch, which has been heated in order to allow the natural polymers to cross link, and to allow some of a liquid fraction of the mass to evaporate, providing for a relatively rigid, foamed wall structure. The product is mold formed, preferably using a closed mold into which the mass is injected under pressure.

Figure 3A:
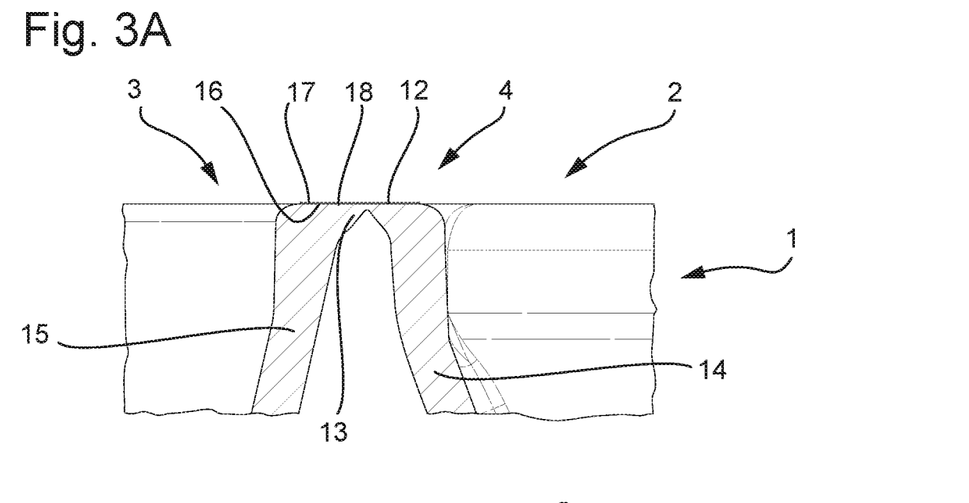
FIG. 3A an enlarged view of a hinge construction of a product according to the disclosure, in a first embodiment, prior to a first hinging.
Figure 3B:
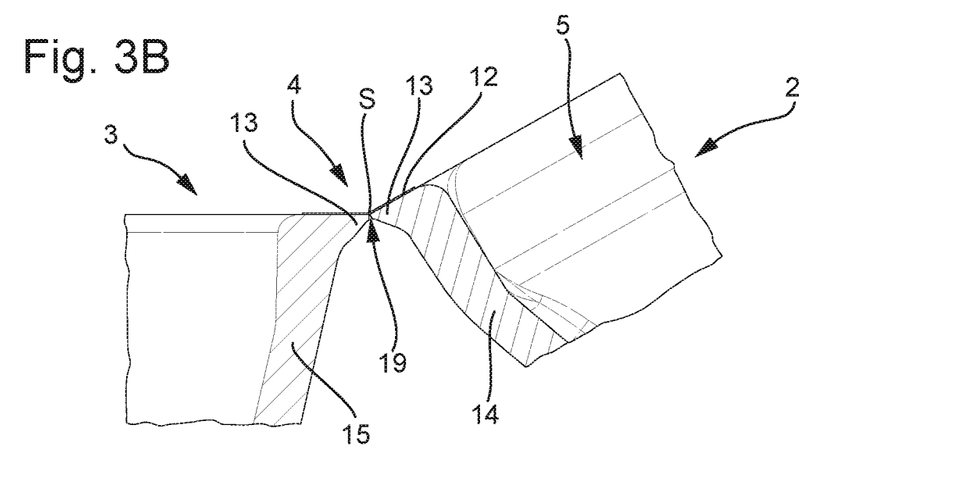
FIG. 3B an enlarged view of a hinge construction of a product according to the disclosure, as shown in FIG. 3A, after a first hinging.
Figure 3C:
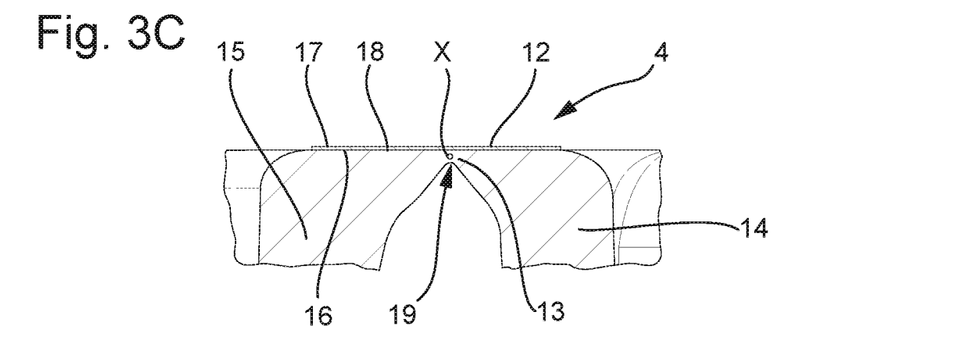
FIG. 3C the hinge construction of FIG. 3A at an enlarged scale.

The hinge construction 4 comprises, as can for example also be seen in FIGS. 2 and 3, at least a flexible sheet element 12 or a series of such elements 12, and a bridge portion 13 or a series of bridge portions 13. The or each flexible sheet element 12 is connected to the first and second product parts 2, 3. The or each bridge portion 13 is also connected to the first and second product part 2, 3, and is made of a mass comprising natural polymers which are cross linked. Preferably the or each bridge portion 13, which may also be referred to as a bridge element 13, is made integral with and of the same mass as the first and second product part 2, 3.

The or each bridge portion 13 is preferably less flexible than the or each flexible sheet element 12, such that when the second product part 3 is hinged, over the hinging construction 4, onto the first product part 2, for closing the product 1, especially as a packaging product 1, the or each flexible sheet element 12 is bent and/or folded, whereas the or each bridge portion is severed, for example broken, sheared and/or torn, at least to an extend significantly lowering stiffness of such bridging portion 13, preferably breaking the or each bridging portion 13, such that the first and second product part 2, 3 are thereafter only connected to each other by the or each flexible sheet element 12. The flexible sheet element or elements 12 after severing of the bridging portion or portions 13 allow for repeated hinging of the second product part 3 relative to the first product part 2, whereas prior to severing said bridging portion or portions 13 such hinging is substantially prevented by the stiffness of the or each bridging portion 13.

FIG. 3A shows a cross section of a hinging construction 4 between a first product part 2 and a second product part 3, by way of example, after molding, prior to hinging for the first time. FIG. 3C shows the same, at an enlarged scale. Here the bridging portion 13 is shown extending between and formed integral with a second wall 14 of the first product part 2 and a first wall 15 of the second product part 3. The bridging portion 13 in this embodiments is made of the same material as the first and second product parts 2, 3. In the embodiment of FIG. 3A the bridging portion 13 is in contact with a first surface 16 of the flexible sheet element 12, whereas the opposite second surface 17 of said element 12 lies free. In this embodiment the bridging portion 13 has a substantially flat side 18 in contact with the flexible sheet element 12 and a generally groove shaped opposite side, for example having a substantially V-shaped cross section in a plane perpendicular to a longitudinal axis X extending perpendicular to the plane of drawing of FIG. 3-C, said axis X extending parallel to and/or coinciding with the hinging line S. Hence a mid section 19 of the bridge portion 13 is thinnest and hence most likely to be severed first, when hinging. This will substantially define a hinging line S for the flexible sheet element 12 to bend or fold.

FIG. 3B shows the same cross section of a product as FIGS. 3A and C, but after hinging of the second product part 3 relative to the first product part 2. In FIG. 3B the flexible sheet element 12 has been bent or folded at or near the folding or hinging line S, whereas the bridge portion 13 has been broken (at said thinnest part 19), significantly reducing stiffness of the hinging construction 4 connecting the first product part 2 with the second product part 3. The sheet element 12 maintains connected to the first and second product parts 2, 3.

As can be understood from the disclosure, preferably the flexible sheet element 12 and the bridging portion 13 are designed and configured such that when bending the hinging construction 4, for example by pivoting the second part 3 relative to the first part 2 (as e.g. shown in FIGS. 3A and B) the bridge portion 13 will sever, especially break, without severing the flexible sheet element 12. The bridging portion 13 may for example be less flexible and/or more brittle that the flexible sheet element 12.

Figure 9A:
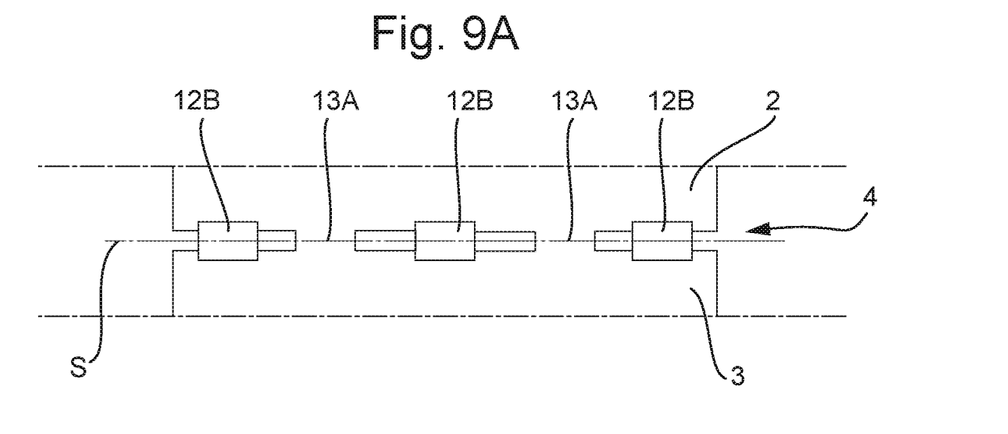
FIG. 9A-9C different embodiments of alternative hinge constructions.
Figure 9B:
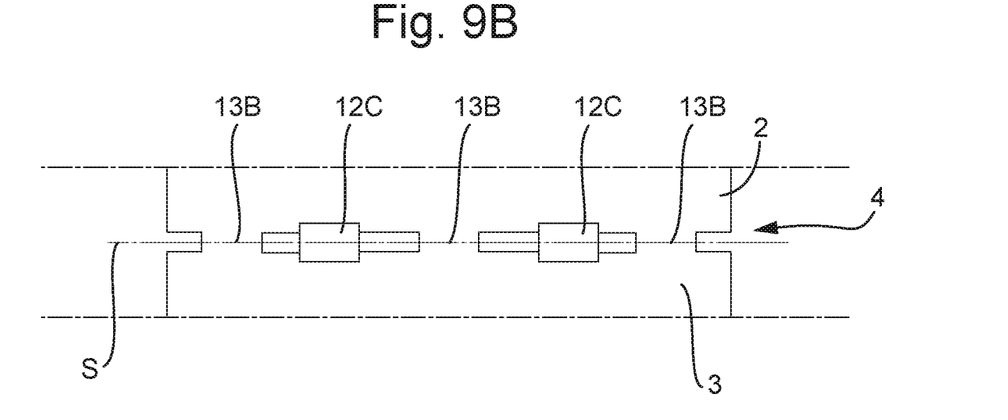
Figure 9C:
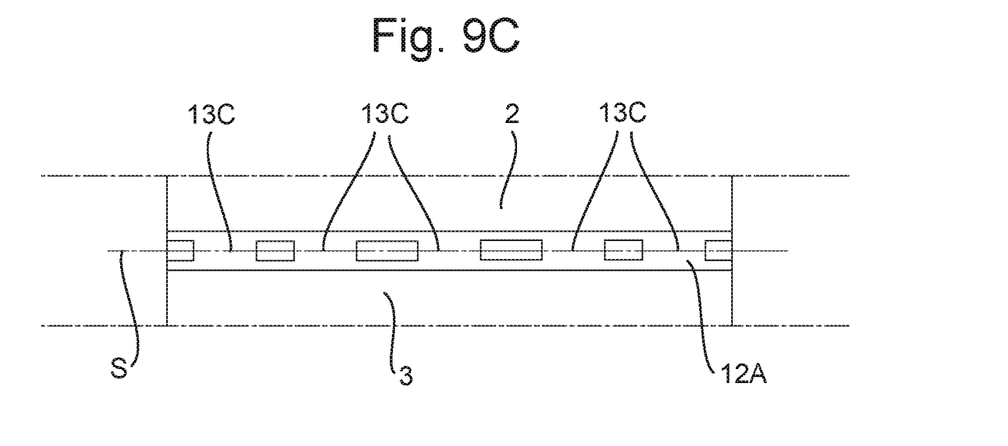

In the embodiment of FIGS. 1 and 1A the flexible sheet element 12 is provided as a strip 12A, extending over a longitudinal length L of a second wall 14 of the first product part 2 and a first wall 15 of the second product part 3. The flexible sheet element 12 bridges a gap 20 between the first and second product parts 2, 3. In FIG. 9A-C different alternative embodiments are shown, in which for example multiple bridge portions 13 and/or multiple sheet elements 12 are provided. For example FIG. 9A shows in top view a hinge construction 4 comprising three spaced apart flexible sheet elements 12B, with in between two spaced apart bridging portions 13A. FIG. 9B shows a hinge construction in top view, comprising three spaced apart bridging portions 13B, with two flexible sheet elements 12C in between. FIG. 9C shows an embodiment of a hinging construction 4 comprising a strip 12A of flexible sheet material, covering five spaced apart bridging portions 13C. Obviously many other combinations of sheet elements 12 and bridge portions 13 are possible within the scope of this disclosure.

A flexible sheet element 12 in this disclosure can be made of any suitable pliable and/or foldable material, such as but not limited to paper, plastic, fabric or the like, and can be a single layer sheet or can be a laminate of different layers of the same or different materials. Preferably the flexible sheet material is biodegradable, comprising natural materials.

The or each bridging portion 13 is preferably made such that after demolding of the product 1 the or each bridging portion 13 will break when bent over an angle of in excess of 45 degrees, at least over an angle of 90 degrees, more preferably at least when bending over an angle of about 180 degrees. The product can, in embodiments, be formed such that at least one layer of material made of said polymer based mass covering said sheet material 12 is designed to break when the sheet material is folded over said hinging line S. In the embodiments shown in FIG. 1-3 the or each bridge portion 13 is substantially symmetrical in cross section (as shown in FIG. 3A-C), such that the hinge line S lies substantially in the middle of the gap 20 between the wall parts 14 and 15. By designing the bridge portion(s) differently the position of the hinge line S can be adjusted.

Figures 4, 4A:
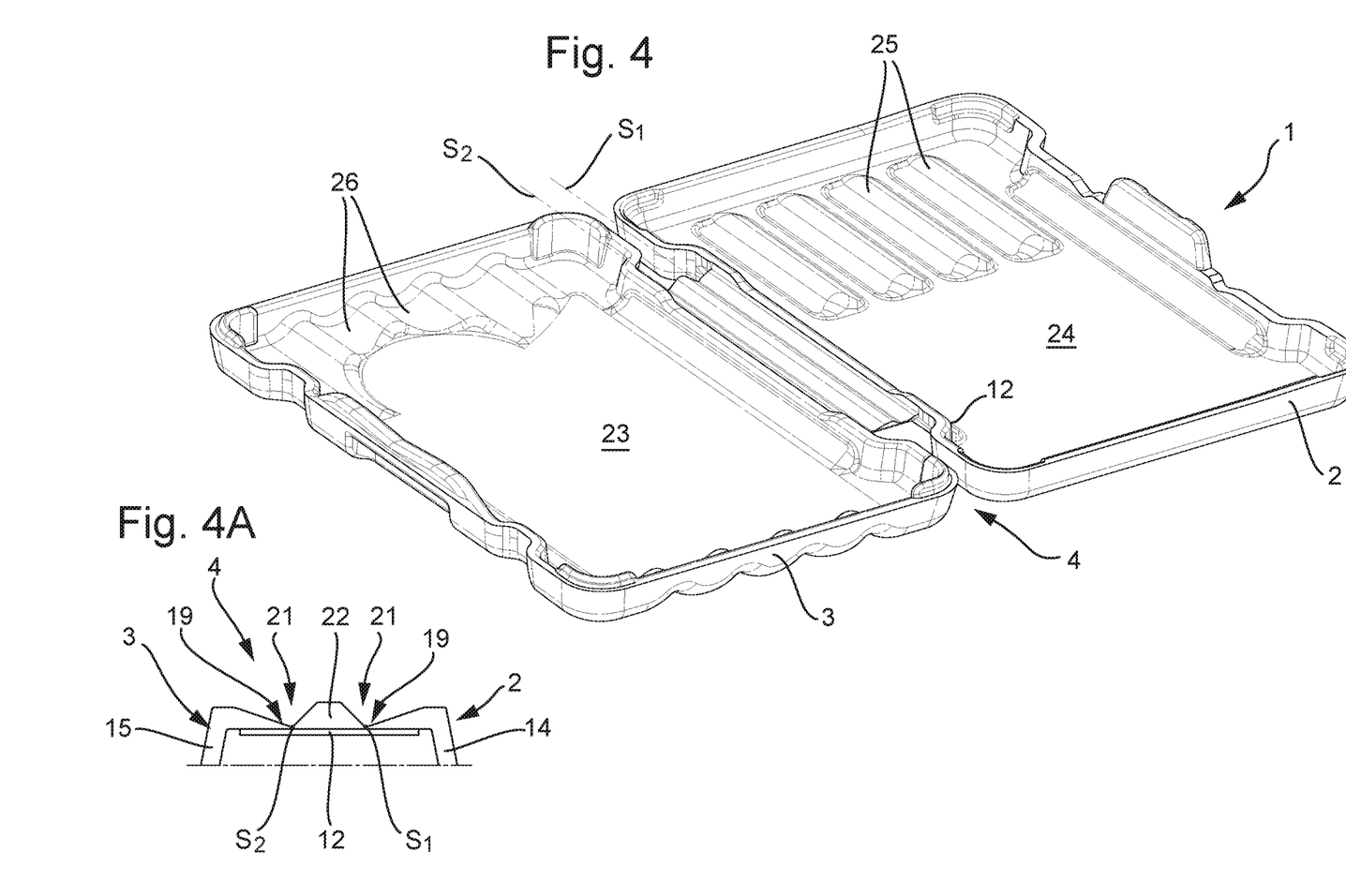
FIG. 4 in perspective view an alternative embodiment of a hinging product, in open position.
FIG. 4A an enlarged view of a hinge construction of a product according to the disclosure, as shown in FIG. 4.
Figure 5:
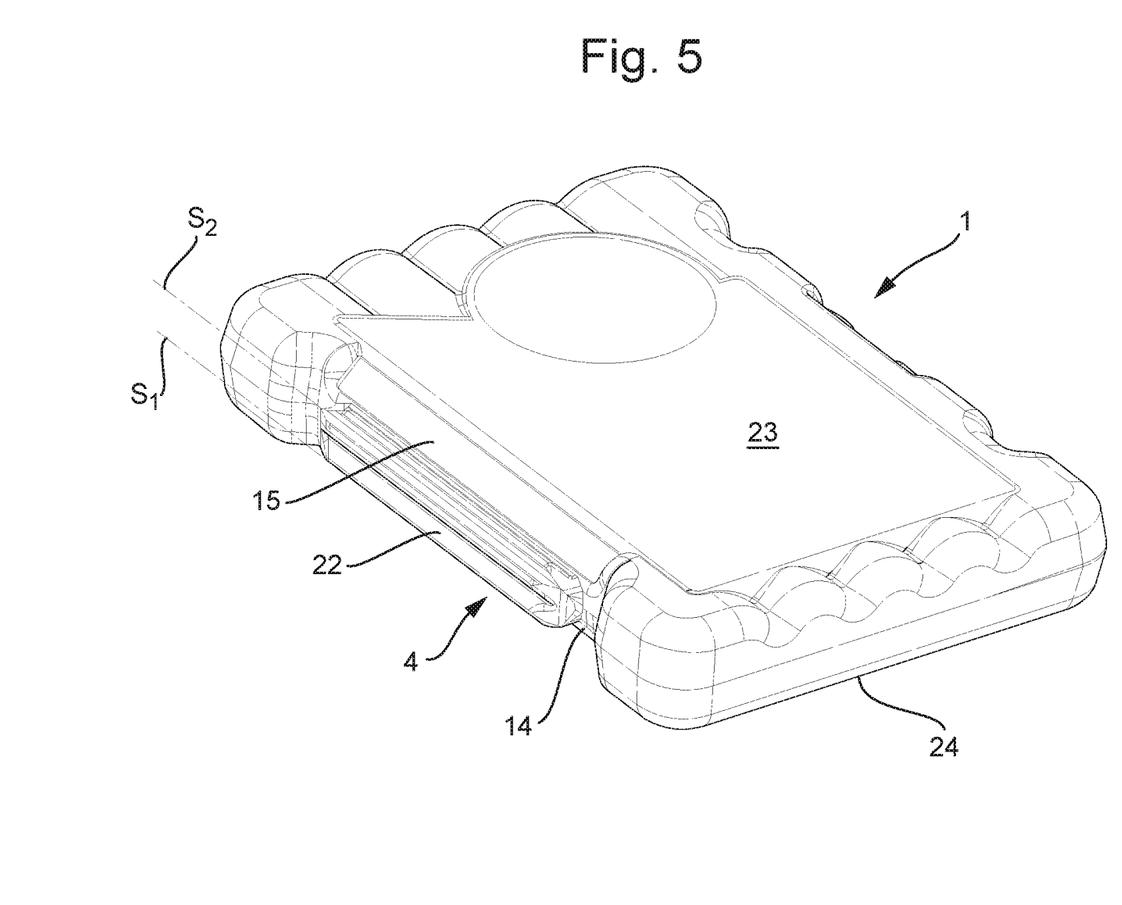
FIG. 5 the product of FIG. 4, in closed position.

FIGS. 4 and 5 schematically show an alternative embodiment of a product 1 according to the disclosure, again having a first product part 2 connected to a second product part 3 by a hinge construction 4. The hinge construction 4, as schematically shown in enlarged view in cross section in FIG. 4A, again comprises a flexible sheet element 12 connected to the first product part 2 and second product part 3, wherein a bridging portion 13 is provided, which after demolding and prior to a first hinging extends over said sheet element 12 and also connects the first and second product parts 2, 3, similar to the embodiment of FIG. 1-3. In this embodiment however the bridging portion 13 is designed having two thin sections 19 formed by the lower side of two substantially parallel grooves 21 having a substantially V-shaped cross section. In between said grooves a raised, thicker portion 22 is provided.

Again, as in the embodiment of FIG. 1-3, in the open position as shown in FIG. 4, directly after molding, i.e. before the second product part 3 is tilted for the first time relative to the first product part 2, the bridging portion 13 or portions is/are relatively stiff, compared to the flexible sheet element 12, preferably stiff enough to be able to lift the product in a substantially horizontal position by engaging one of the first and second product parts 2, 3 only, without the other of the first and second product parts 2, 3 tilting significantly relative to the first product part due to the force of gravity acting on said other product part. Without tilting significantly should be understood here as at least meaning that there is no tilting sufficient to break the bridging portion or at least one of the bridging portions. Hence such bridging portion(s) allow(s) for example demolding, stacking and de-stacking of the open products in an easy manner, as well as for example handling, for example by robots, when transporting such product 1 to a filling station for filling the product with products to be packaged therein.

When the second product part 3 of a product 1 of FIGS. 4 and 5 is tilted relative to the first product part 2, in order to close the product 1 to the position as shown in FIG. 5, the (or each) bridging portion 13 will sever, such as break or tear at both of the thin portions 19, allowing double hinging of two substantially parallel hinge lines $S_1$ and $S_2$ located at or near said thin portions 19. As can be seen in FIG. 5, in the closed position the thicker portion 22 will extend substantially vertically when the opposing faces 23, 24 of the first and second part 2, 3 lie substantially parallel to each other in a substantially horizontal position.

In the embodiment shown in FIGS. 4 and 5 the first product part 2 comprises a series of ridges 25 and the second part a series of grooves 26, such that for example cigars, pens or the like substantially cylindrical products (not shown) can be packaged in the product 1.

Figure 6:
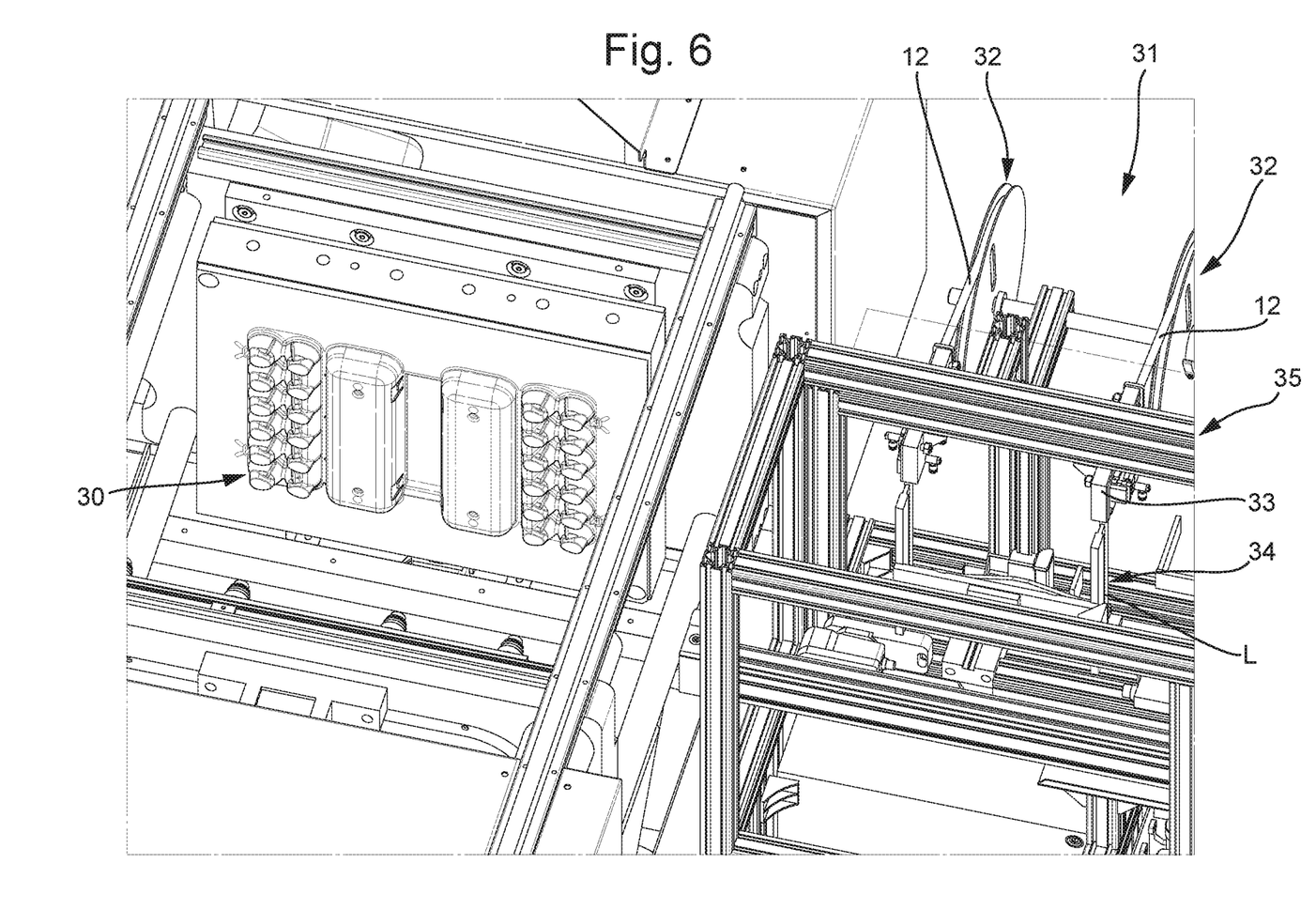
FIG. 6 part of an apparatus for forming a product according to the disclosure, with an open mold and a sheet system in a position picking up flexible sheet elements.

FIG. 6 schematically shows an apparatus 40 for forming products 1 according to the disclosure, with an open mold 30 for forming products 1. In this example the mold is designed for side by side forming two products 1 according to FIG. 1, as well as part of a supply 31 for flexible sheet material 12, especially strips 12A of such material 12, and a transfer device 35 for transferring said strips 12A to the mold 30. In this embodiment the supply 31 comprises two rolls 32, each comprising a length of said material 12. From each roll the strip 12A is fed over a guide 33 to a substantially vertical position, in front of two parallel pick up devices 34 of the transfer device 35 which each engage a length L of strip 12A cut of the relevant roll 32.

Figure 7A:
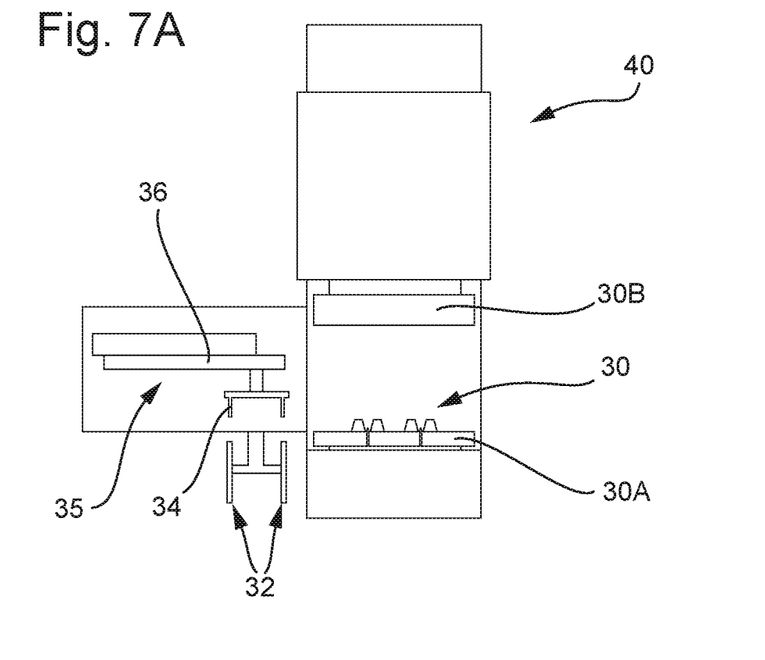
FIGS. 7A and B the apparatus of FIG. 6, with the sheet system in a position picking up flexible sheet elements and placing flexible sheet elements in a mold respectively.
Figure 7B:
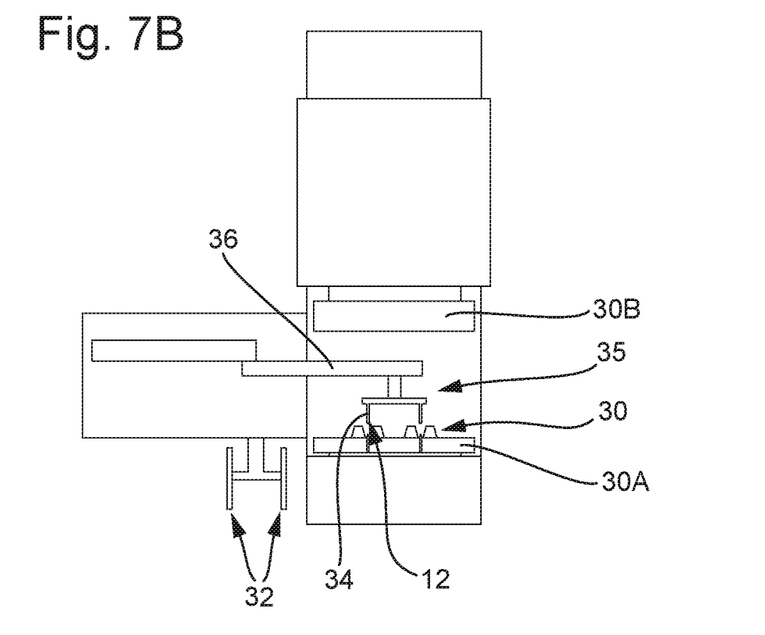

FIGS. 7A and B schematically show an apparatus 40, with an open mold 30 comprising, in a conventional way, first and second mold halves 30A and B, the first mold halve 30A being shown in FIG. 6. FIG. 7A shows the transfer device 35 in a position for picking up flexible sheet material 12 such as strips 12A. The transfer device comprises for example a rail or arm system 36, with which the pick up devices 34 can be moved from the position as shown in FIG. 7A to a position in FIG. 7B and vice versa. During use the pick up devices 34 pick up two strips 12A in the position of FIG. 7A and transfer the strips 12A to the position as shown in FIG. 7B, in which position the strips are transferred from the pick up devices into the mold 30, especially in the position to be molded into the product, as will be discussed in further detail hereafter. Then the pick up devices 34 are moved back to the position of FIG. 7A and the mold can be closed for a molding cycle in which a mass can be injected into the closed mold, which is then heated for at least cross linking natural polymers in the mass, after which the products can be taken out of the mold, for example using ejectors (not shown) or other demolding systems and provisions as known in the art. During molding of the product the sheet material 12, especially the strip 12A, is connected securely to the product.

Figure 8:
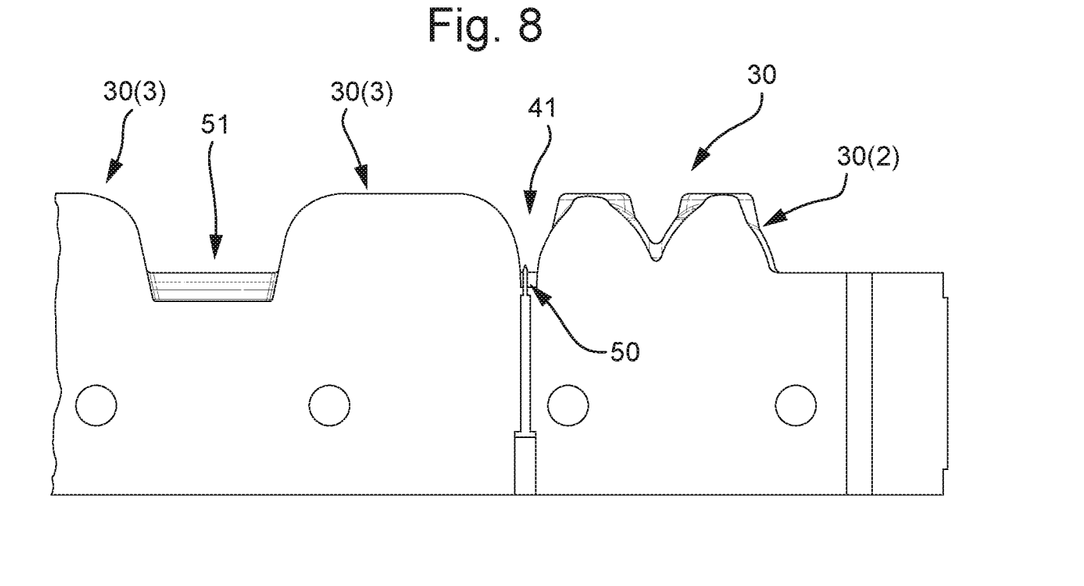
FIG. 8 in cross sectional view part of a mold part, showing a pin for holding a flexible sheet element.
Figure 8A:
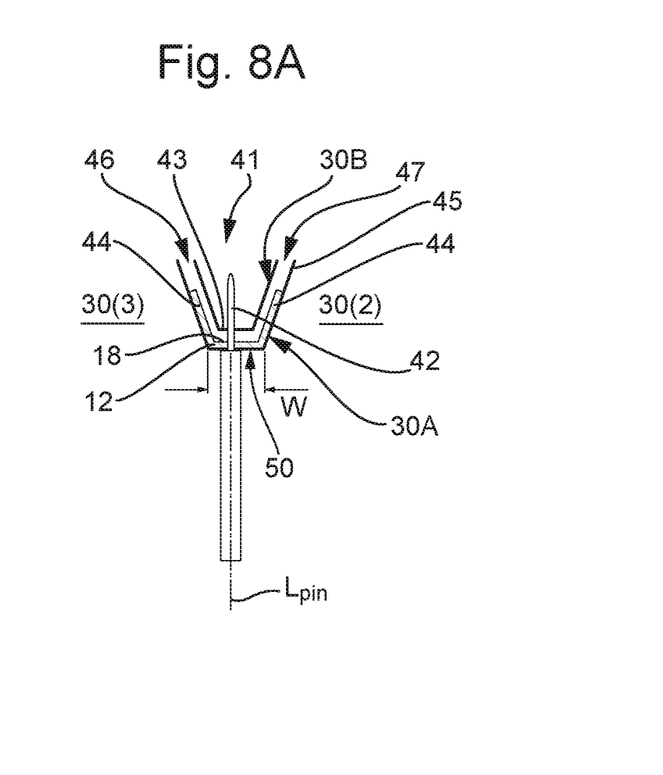
FIG. 8A a flexible sheet element, such as a strip, pinned onto a pin.

A mold 30 according to the disclosure preferably comprises at least one retainer or retainer system 41 for keeping the or each flexible sheet element 12 in a fixed or at least pre defined position during at least introduction of the mass into the mold 30, especially when the mass is passed over said at least one flexible sheet element 12. In FIGS. 8 and 8A an embodiment of a retainer 41 is shown, forming part of a retaining system 41. In this embodiment the retainer 41 as shown is formed by a sharp pin 42 extending above a surface 43 forming part of a bridging portion 50 extending between a mold part 30(2) for forming the first product part 2 and a second mold part 30(3) for forming a second product part 3. The said surface 43 is designed such that the outer surface 18 of the strip 12 can be placed against it. In this embodiment the surface 43 is substantially flat, but it could also be designed differently, for example curved in cross section. The width W of said surface 43 between the first and second product part 2, 3 forming portions 30(2) and 30(3) can for example be about the same as the width of the strip (perpendicular to the longitudinal axis X). In FIG. 8A the width W of the surface 43 is shown smaller than the width W12 of the strip 12A, such that side portions 44 of the strip are folded against wall forming portions 45, 46 of the first and second product forming parts 30(2) and 30(3).

When transferring a strip 12A into the mold 30, the strip 12A is forced over the or each retainer, especially the or each pin 42, puncturing the strip 12A. Thus when released by the transfer device the strip will be retained in the mold 30 by the or each pin 42.

As can be seen in FIG. 8A, the mold part 30B can be closed over the mold part 30A and hence over the pin 42. In embodiments the pin 42 could be shorter, such that its free, sharp end 42A extends inside the mold cavity 47 formed. A closed mold cavity 47 is formed, enclosing the strip 12A. In embodiments the or each pin 42 can be movable in a longitudinal direction $L_{pin}$, for example such that it can be retracted for releasing the product 1 with the strip 12A during demolding or for forcing the pin through the strip 12A prior to or during closure of the mold 30.

During molding a mass such as a batter, suspension or liquid is introduced into the mold cavity 47, through at least one introduction opening or injection point 51, preferably spaced apart from the or each flexible sheet element 12. Such at least one introduction point can for example be provided between the two product forming parts of a double mold as shown in FIGS. 6, 7 and 8. The mass is introduced such that it can pass over and/or under and/or alongside at least part of the at least one flexible sheet element 12, forming the or each bridge portion 13. In alternative embodiments a mass is introduced into the mold prior to or during closure, forcing the mass to fill the mold cavity 47 by closing the mold 30. In such embodiment the or each or at least one flexible sheet element 12 could be provided after providing the mass in the mold, for example during closure.

In stead of or additional to one or more pins 42 for retaining the strip 12A and/or other flexible sheet elements 12 other retaining provisions can be provided, such as for example clamps clamping the or each flexible sheet element 12 in position, for example clamping opposite ends of the strip during molding, which ends can be released upon demolding and/or can be cut off during demolding. Retaining means can also comprise vacuum cups and/or strips for temporarily retaining a flexible sheet element 12 in position. Similarly other transfer means can be provided for placing a strip in a mold. For example a strip can be pulled from a roll directly into the mold. In embodiments each flexible sheet element 12 can be provided on a continuous carrier from which the sheet element or elements is/are released for example upon transfer into the mold or upon demolding of a product to which the sheet element is or elements are connected during molding.

The invention is by no means limited to the embodiments disclosed herein by way of example only. Many variations thereof are encompassed by the invention as defined by the claims, including all combinations of features as disclosed herein.

For example materials can be used comprising other materials than starch, such as but not limited to tapioca. In embodiments products 1 according to the disclosure can have multiple hinging parts, some or all connected by a hinge construction as disclosed herein. A product according to the disclosure can be a product different from a packaging. Parts of a product can be made of a different material. In embodiments a flexible sheet element forming part of a hinge construction can extend further into one of more, such as both of the product forming portions, for example for forming a surface area thereof. In the embodiments shown the or each flexible sheet element is shown at an outer surface area of the product. However such sheet element could also be provided at an inner surface area of the product. In embodiments bridging portions could be provided on both sides of a flexible sheet element.

These and other such embodiments are considered to also fall within the scope of the disclosure as mainly defined by the claims.

The invention claimed is:

1. A product made using a mass comprising natural polymers, wherein the product comprises a first product part connected by a hinge construction to a second product part, wherein the hinge construction comprises at least one bridge portion made of said mass comprising natural polymers and at least one flexible sheet element, wherein the hinge construction is designed such that, prior to a first time hinging, the at least one bridge portion forms a more rigid connection between the first and second product parts than the at least one flexible sheet element and by hinging said at least one bridge portion is severed, such that the first and second product parts are substantially only connected by the at least one flexible sheet element.

2. The product according to claim 1, wherein the hinge construction defines a hinge line, wherein the at least one flexible sheet element is covered on at least one surface by said mass, forming said at least one bridge portion, wherein said at least one surface comprises a surface part facing in a direction perpendicular to said hinge line.

3. The product according to claim 1, wherein the hinge construction defines a hinge line, wherein the at least one flexible sheet element is formed by or comprises a flexible sheet element which has a longitudinal direction, wherein at least one side of said flexible sheet element is covered at least partly by said at least one bridge portion, wherein said at least one side of the flexible sheet element faces in a direction perpendicular to the hinge line.

4. The product according to claim 1, wherein said at least one flexible sheet element comprises a first flexible sheet element and a second flexible sheet element, and wherein the at least one bridge portion is provided at least partly between said first and second flexible sheet elements.

5. The product according to claim 1, wherein each of the first product part and the second product part is or comprises a shell shaped part, the first product part and the second product part hingeably connected to each other by said hinge construction, such that the first product part can be hinged against the second product part for enclosing a volume defined by said shell shaped product parts, and wherein said at least one flexible sheet element is facing said volume when the first product part is hinged against said second product part.

6. The product according to claim 1, wherein said at least one bridge portion comprises first and second bridge portions and said at least one flexible sheet element extends between said first and second bridge portions.

7. The product according to claim 1, wherein said at least one flexible sheet element comprises a first flexible sheet element and a second flexible sheet element and said at least one bridge portion comprises a first bridge portion and a second bridge portion, wherein said first bridge portion is provided at least partly between said first and second flexible sheet elements and said first flexible sheet element is provided between said first and second bridge portions.

8. The product according to claim 1, wherein the product is a baked product and the at least one flexible sheet element is made of one of plastic, paper and fabric.

9. The product according to claim 1, wherein the product is formed in a mold, wherein the mass is baked in the mold.

10. The product according to claim 9, wherein the at least one flexible sheet element is a sheet element made separately from the mass and is molded into the mass in the mold, such that the at least one flexible sheet element is connected to the mass.

11. The product according to claim 9, wherein the at least one flexible sheet element is made of at least one of a plastic, paper and/or fabric.

12. The product according to claim 1, wherein the mass is a batter or suspension comprising natural polymers, which batter or suspension has been baked for forming the product.

13. The product according to claim 1, wherein the at least one bridge portion is less flexible than the at least one sheet element, or wherein the at least one bridge portion is more brittle than the at least one sheet element.

14. The product according to claim 1, wherein the at least one flexible sheet element is positioned on top of a first edge portion of the first product part and on top of an adjacent second edge portion of the second product part and is adhered to said first and second edge portions.

15. The product according to claim 14, wherein the at least one flexible sheet element extends over the at least one bridge portion.

16. A product made using a mass comprising natural polymers, wherein the product comprises a first product part connected by a hinge construction to a second product part, wherein the hinge construction comprises at least one bridge portion made of said mass comprising natural polymers, wherein the hinge construction is designed such that, prior to a first time hinging, the at least one bridge portion forms a more rigid connection between the first and second product parts than the at least one flexible sheet element and by hinging said at least one bridge portion is severed, such that the first and second product parts are substantially only connected by the at least one flexible sheet element, wherein the at least one flexible sheet element has a width direction parallel to a hinge line defined by the hinge construction, a length direction perpendicular to the width direction and extending from the first product part to the second product part, and a thickness direction perpendicular to the width direction and the length direction, wherein the at least one flexible sheet has an upper surface and a lower surface, seen in the thickness direction on opposite sides of a portion of the flexible sheet element extending between the first product part and the second product part, wherein of the upper surface or the lower surface is at least partly covered by said mass, forming said at least one bridge portion.

* * * * *